United States Patent [19]

Arnoldy

[11] Patent Number: 5,569,395
[45] Date of Patent: Oct. 29, 1996

[54] DEEP COAT FACED PLATE AND METHOD

[75] Inventor: Roman F. Arnoldy, Houston, Tex.

[73] Assignee: Arnco Technology Trust, Houston, Tex.

[21] Appl. No.: 290,820

[22] PCT Filed: Feb. 9, 1993

[86] PCT No.: PCT/US93/01200

§ 371 Date: Aug. 18, 1994

§ 102(e) Date: Aug. 18, 1994

[87] PCT Pub. No.: WO93/16873

PCT Pub. Date: Sep. 2, 1993

[51] Int. Cl.$^6$ ........................................ B23K 9/04
[52] U.S. Cl. .............. 219/76.14; 219/137 WM; 219/146.32
[58] Field of Search ............... 219/76.14, 137 WM, 219/146.32

[56] References Cited

U.S. PATENT DOCUMENTS

| | | | |
|---|---|---|---|
| 2,927,990 | 3/1960 | Johnson | 219/76.14 |
| 2,965,746 | 12/1960 | Cresswell | 219/137 WM |
| 3,060,307 | 10/1962 | El-Sherif | . |
| 3,062,948 | 11/1962 | Arnoldy | . |
| 3,076,888 | 2/1963 | Arnoldy | 219/73 |
| 4,110,514 | 8/1978 | Nicholson | . |
| 4,122,817 | 10/1978 | Matlock | . |
| 4,160,066 | 7/1979 | Szumachowski et al. | . |
| 4,426,426 | 1/1984 | Muhlberger | 219/137 WM |
| 4,515,870 | 5/1985 | Bose et al. | . |
| 5,010,225 | 4/1991 | Carlin | 219/76.14 |

FOREIGN PATENT DOCUMENTS

| | | |
|---|---|---|
| 59-78774 | 5/1984 | Japan . |
| 60-228650 | 11/1985 | Japan . |

*Primary Examiner*—Clifford C. Shaw
*Attorney, Agent, or Firm*—James F. Weiler

[57] ABSTRACT

Disclosed are methods of facing a surface of a weldable iron based material with a consumable iron based electrode and alloy forming elements by creating an electric arc between the electrode and the surface of the weldable base material effective to form a weld puddle of which the weldable base material provides from about 35% to about 80% by weight, and preferably a major portion, of the weld puddle formed by the electrode and the base plate and by depositing and melting a predetermined quantity of alloy forming elements in the weld puddle to form an alloy abrasion resistant or corrosion resistant facing. Also disclosed are plates having abrasion or corrosion resistant surfaces in which from about 35% to about 80% and preferably a major portion of the weld puddle formed by the electrode and the base material is the weldable iron based material.

7 Claims, No Drawings

DEEP COAT FACED PLATE AND METHOD

FIELD OF THE INVENTION

The present invention is in the field of hardfacing and providing wear or corrosion resistance to industrial equipment.

BACKGROUND OF THE INVENTION

Hardfaced plate is a product manufactured to resist the abrasion of bulk materials such as earth, rock, ores, and other silicious materials. It is used in the construction and the protection of fabrications of many kinds.

It consists of a base plate of any suitable analysis which has been weld overlaid with an alloy which contains typically up to 40% chromium carbide.

Depending upon the alloy content and method of application, the overlay can contain several types of chromium carbides. Only the primary type of carbide has the high abrasion resistance needed to make this product outwear other overlays or hard metals of a low cost type. This is identified by the formula $M_7 C_3$ where M is an alloy of iron and chromium.

Analysis of the individual carbides cannot be done with any common commercial equipment, but the carbide can be identified by its form and shape in a micrograph of the deposit.

Common mild steel plate is used as the base plate for nearly all manufacture of this product as it is sufficient to supply whatever strength and shock resistance are needed and is most cost effective.

The preferred method of manufacture uses the bulkweld process wherein alloy powder and wire are melted together in a welding arc and simultaneously welded to the base plate while melting an amount of base plate to obtain a weld bond, such as set forth in U.S. Pat. No. 3,076,888. Other patents illustrating hardfacing are U.S. Pat. Nos. 3,000,094; 3,060,307; 3,062,948; 3,407,478; 3,494,749; 3,513,288; 3,517,156; 3,588,432; and 3,609,292.

As the overlay is made by welding, it is not capable of precise parameters. There will be a typical variance between melting of about 20% or less base metal on the one hand and a lack of bond (no melted base metal) on the other hand. With lack of bond the overlay can break off, and with the heavier melting of base metal there is dilution of the overlay material with iron with the result that the type of carbides formed are low in abrasion resistance. In prior art processes, over 15% melted base material is not acceptable.

In the present state of the art all of the iron intended to produce the alloy is supplied by the electrode, usually a wire but it can be a strip. Whatever amount of base metal is melted is for the purpose of producing a bond only.

In the present art the unintentional melting of base plate (beyond the small amount needed for bond) progressively reduces the formation of primary chromium carbides which are the principal constituents which give the product its high abrasion resistance.

In a typical operation the welding parameters are critical within a narrow range. Because of the nature of a welding process, the operation is difficult to control within that range. A relatively small heat input above the desired level will cause greater base metal melting and undesirable structure while a relatively small reduction in current will cause lack of bond allowing the overlay to break off.

In the present invention, the base metal is intentionally melted and intentionally forms part of the alloy surface being produced. This insures bonding of the alloy surface to the base, and the metal supplied from the metal base to be part of the alloy produced is of much lower cost than that supplied by the electrode wire.

In the manufacture of hardfaced or corrosion resistant plate the most efficient application and easiest to produce quality is obtained when employing the bulkweld system of welding as described above. More particularly, in this system the arc which does the melting and the iron required of the alloy facing are supplied by steel (iron) electrode (wire) continuously fed by automatic welding equipment. The carbide or corrosion resistant forming elements required and the other elements needed are supplied by powder metered into the weld zone in a precalculated ratio to the amount of wire used. As these elements fuse and mix in the weld puddle, they together produce the desired facing alloy.

In order to melt a greater amount of base metal, a larger current is needed than in current overlay welding. In utilizing a larger current in the current prior art processes, a greater amount of base metal is melted, but the greater current overloads the electrode wire (3/32") and causes it to melt very fast and thus still supply most of the iron needed in the weld.

It would be highly advantageous to increase the quality of the abrasion resistant surface to provide assurance of a weld bond, to increase the speed of application, and to decrease the cost of materials and labor.

SUMMARY OF THE INVENTION

The present invention utilizes the bulk welding process such as disclosed in U.S. Pat. No. 3,402,459, but a major part of the iron required in the overlay is the melted base plate rather than the electrode, and the carbide structure or corrosion resistance needed is produced by adding those elements needed to form that structure in the resulting iron rich weld puddle.

Electrode melting is a function of polarity, current at the arc, and electrode preheating before it reaches the arc. The electrode preheat is a function of the current, the resistance of the electrode (wire), and the time of heating. To prevent increased electrode melting when current is increased to melt more base metal, the electrode size is increased. This does two things: It decreases the resistance to lessen the preheat, and it provides a larger cross section at the arc to decrease current density on the electrode and thus lower electrode melting rate.

The needed extra alloy is provided by adding only the kind and amounts of elements actually needed to produce the primary carbide structure at a 4–5% carbon level in the deposit in hardfacing. This avoids having to manage and melt an over-large bulk of powder with the difficulties it produces in welding.

Any combination of parameters which cause from about 35% to about 80% by weight of the combined metal of electrode and weldable base metal (almost always iron) to be supplied by the melted base metal meets the requirements for the present invention. Preferably, at least 50% of the metal of the combined base metal and the electrode required to produce the overlay alloy is the weldable base material.

Accordingly, it is an object of the present invention to provide a bulkwelding process which overcomes the disadvantages of the prior art processes mentioned above.

A further object of the present invention is the provision of a bulk welding process in which the quality of the abrasion or corrosion resistant facing is improved to provide an assured weld bond in which the speed or rate of application of the facing applied is increased and in which the cost of materials and labor is decreased.

It is a further object of the present invention to supply a major part of the iron required in the overlay with melted base plate, and the carbide or corrosion resistance structure needed is produced by adding only those elements required to that structure in the resulting iron rich weld puddle.

A further object of the present invention is to produce the highest levels of primary carbides while drawing up at least one-half of the iron required in the hardfacing from melted base metal.

A further object of the present invention is to produce hardfacings in which the desired thickness is in its more inexpensive form and to eliminate the problems as between missed bond on the one hand and excessive dilution on the other that are inherent in the present state of the art processes.

It is a further object of the present invention to produce a product of higher and more consistent quality than prior art hardfacings or corrosion resistant facings while at the same time requiring less precision in welding parameters.

A further object of the present invention is the provision of an abrasion or corrosion resistant surface, such as abrasion resistant plate, in which preferably at least 50% of the metal of the base material and the electrode used to produce the overlay alloy will come from the base material.

A further object of the present invention is the provision of a hardfaced or corrosion resistant surface welded to a weldable base material, such as hardfaced plate, in which about 35% to about 80% by weight of the metal of the base metal and the electrode is supplied by the base metal.

A further object of the present invention is the provision of an abrasion resistant alloy surfaced plate which has a primary carbide structure at a 4–5% carbon level in the deposited alloy.

Other and further objects, features, and advantages of the present invention appear throughout the specification and claims or are inherent therein.

DESCRIPTION OF PRESENTLY PREFERRED EMBODIMENTS

Briefly, the method of this invention of hardfacing or corrosion resistant facing a surface of weldable base material comprises creating an electric arc with a consumable electrode between the surface of the weldable base material to form a weld puddle in the base while depositing and melting a predetermined quantity of alloy forming particles in the weld puddle so that at least about 35% to about 80% by weight and preferably at least one half of the iron based material required in the final weld provided by the weldable base metal and the electrode is the weldable base metal. Thus, preferably a major part, such as at least 50% by weight of the iron required in the overlay supplied by the base metal and the electrode is melted base plate rather than electrode. The alloy structure, such as carbide structure, or the corrosion resistant structure needed is produced by adding only those elements, which include some iron to form that alloy structure in the resulting iron rich weld puddle.

In order to melt a greater amount of base metal, a larger electric current is needed. In the prior art processes, such as disclosed in U.S. Pat. No. 3,076,888, more alloy addition is required to produce the alloy composition needed to form the desired level of hardfacing components, such as primary carbides or corrosion resistant components, such as alloys of chromium, nickel, carbon, and iron. More wire can be melted as wire melting is directly proportional to the current for a given set of parameters. The result will be too much iron in the deposit, low alloy content, and lack of primary carbide. The present invention provides increased base melting without significantly increasing electrode melting. Electrode melting is a function of polarity, current at the arc, and electrode preheating before it reaches the arc. The electrode preheat is a function of the current, the resistance of the electrode or wire, and the time of heating. To prevent increase electrode melting when the current to melt more base is increased, the electrode size, that is its cross sectional area, is increased. This does two things: It decreases the resistance to lessen the preheat, and it provides a larger cross section at the electric arc to decrease current density on the electrode and thus lower electrode melting rate. In the present invention, the extra alloy is provided by adding only the kind and amounts of elements actually needed to produce the hardfacing or abrasion resistant structure, for example, a primary carbide structure of about 4–5% carbon level in the deposit. In this manner having to manage and melt an over large bulk of powder with the difficulties it produces in welding is avoided.

By way of example, in the prior art, such as disclosed in U.S. Pat. No. 3,076,888, a thin skin of the base plate is melted, that is not more that about 15% by weight to provide the bond. In the present prior art methods, the electrical current rate to the electrode averages about 15.7 kw for an electrode or wire having a 3/32 inch diameter and a current density of 66195 amperes per square inch of electrode cross section. By increasing the electrode cross sectional area to a ⅛ inch diameter, the heat input rate to the electrode can be 24.5 kw with a current density of 57000 amperes per square inch of electrode cross section. The larger cross section at the arc decreases the preheat and current density on the electrode and thus provides a lower electrode melting rate and more base metal melting. While current densities over 57000 amperes per square inch of electrode cross section will melt more base metal, it also melts more electrode.

The following examples and tables provide a comparison of prior state of the art manufacture of hardface plate in the open arc mode to the present invention manufacture of hardfaced plate in the open arc mode. The subarc modes are substantially the same.

EXAMPLE 1

In this example the following input parameters are for present state of art manufacture of hardface plate in the open arc mode.

TABLE 1

| Elemental Content of Powder - Percents | | | | | |
|---|---|---|---|---|---|
| Fe | Cr | C | Mn | Mo | Si |
| Bal (av. 26.25) | 55–58 | 9.75–10.25 | 5–6.5 | .5–1.0 | .5–1.0 |
| Elemental Content of Wire - Percents | | | | | |
| Fe | | C | | Mn | Si |
| Bal (av. 98.9) | | .05–.15 | | .85–1.35 | .05–.35 |

The overlay weld was made in which the target percents were 62% of the input to the weld was powder and 38% was wire. After losses and allowances for up to 15% dilution by the base metal, the final target overlay content was as follows:

TABLE 2

| Fe | Cr | C | Mn | Mo | Si |
|---|---|---|---|---|---|
| Bal (av. 35.8) | 27–29 | 4.5 | 2.5–3.5 | .2–.5 | .2–.4 |

This target content in the overlay gave a primary carbide content of approximately 40% by weight.

EXAMPLE 2

In this example the input parameters were for the production of hardface plate in accordance with this invention in open arc mode. Listed below in Table 3 are the input parameters.

TABLE 3

| Elemental Content of Powder - Percents | | | | | |
|---|---|---|---|---|---|
| Fe | Cr | C | Mn | Mo | Si |
| Bal | 63–66 | 11.2–11.7 | 6–7.5 | .5–1.0 | .5–1.0 |

| Elemental Content of Wire and Plate - Percents | | | |
|---|---|---|---|
| Fe | C | Mn | Si |
| Wire Bal | .05–.15 | .35–1.35 | .05–.85 |
| Plate Bal | .1–.2 | .2–.5 | .05–.85 |

The overlay weld was made in which the target percents were 41% of the input to the weld was powder, 26% of the weld was electrode, and 33% of the weld was fused based metal.

The material inputs and overlay analysis of the hardface plate of the present invention, as set forth in Table 3, are set forth in the following Table 4.

TABLE 4

| Typical Elemental Input - This Invention - in Portions | | | | | |
|---|---|---|---|---|---|
| | Fe | Cr | C | Mn | Mo | Si |
| Powder | 10.7 | 26.8 | 6.4 | 2.5 | .3 | .3 |
| Wire | 26 | 0 | 0 | .2 | 0 | 0 |
| Plate | 33 | 0 | 0 | 0 | 0 | 0 |
| Total Portions | 69.7 | 26.8 | 6.4 | 2.7 | .3 | .3 |
| Stoichiometric Losses | — | 2. | 1.7 | — | — | — |
| Total Portions After Losses | 69.7 | 24.8 | 4.7 | 2.7 | .3 | .3 |
| Percents | 68 | 24.2 | 4.6 | 2.6 | .3 | .35 |

The material inputs and overlay analysis set forth in Table 4 provide a primary carbide content of approximately 40% However, the welding labor required was ⅓ of that required for the prior art process described above at the same rate of deposition.

EXAMPLE 3

In this example, the input parameters were for the production of a corrosion resistant surface in accordance with this invention in sub arc mode. Listed below is Table 5.

TABLE 5

| | Fe | Cr | Ni | Mo | Mn | C |
|---|---|---|---|---|---|---|
| Powder | 7.4 | 21.2 | 9.8 | .7 | 2.0 | .03 |
| Wire | 26.0 | | | | .2 | .02 |
| Plate | 32.6 | | | | | |
| Total Portions | 66.0 | 21.2 | 9.8 | .7 | 2.2 | .05 |
| Stoichiometric Losses | — | .4 | .1 | — | .2 | — |
| Total Portions After Losses | 66.0 | 20.8 | 9.7 | .7 | 2.0 | .05 |
| Percents | 66.5 | 21.0 | 9.8 | .7 | 2.0 | .05 |

The material inputs and overlay analysis set forth in Table 5 provide a satisfactory corrosion resistant surface with a good bond.

The following Table 6 compares the welding parameters of the prior art and of this invention as set forth above.

TABLE 6

| Welding Parameters - Present and with this Invention | | |
|---|---|---|
| | Prior Art Overlay Parameters | This Invention |
| Nominal Overlay Thickness | ⅛" | 3/16" |
| Added Metal | ⅛" | ⅛" |
| Bead Width | 1⅜–1½" | 1⅜–1½" |
| Travel Speed | 8½–9" min. | 8½–9" min. |
| Heat Input Rate | 15.7 kw avg. | 26 kw |
| Wire Size | 3/32" dia. | ⅛" dia. |

Advantageously, automatic or semiautomatic welding equipment can be used in practicing the process of the present invention. The electrodes or wire may be in generally circular cross section or may be strips or may be in tubes. Any desired facing or cladding materials can be utilized. The electrode is fed substantially normal to the surface to be faced and supported by automatic or semiautomatic welding of any known and available type in which the feed of the electrode is held substantially constant at a predetermined rate so that a predetermined quantity of electrode is deposited and melted. Similarly, a predetermined quantity of the alloy forming elements is deposited and melted in the weld base puddle. As previously mentioned, the welding may be open mode or submode, such as covered with flux which is readily available on the market.

The method can be used for cladding surfaces or making plate with a cladded surface in which the plate is secured to a surface to be cladded.

Any desired alloy composition can be made according to the invention. For example, representative alloy compositions which can be made according to the invention are set forth in U.S. Pat. Nos. 3,000,094; 3,076,888; 3,407,478; 3,494,749. Also, the alloy composition can have a cracked pattern such as disclosed in the last two patents mentioned above.

The present invention therefore is well suited and adapted to attain the objects and ends and has the advantages and features mentioned above as well as others inherent therein.

While presently preferred embodiments of the invention have been given for the purposes of disclosure, changes can be made within the spirit of the invention as defined by the scope of the appended claims.

What is claimed is:

1. A method of providing an abrasion or corrosion resistant facing having an alloy composition of a predetermined iron content and a predetermined alloy content on a surface of a weldable iron based material comprising, creating an electric arc between a single iron based electrode and the surface of the weldable iron based material, the electric arc and cross-sectional area of the single electrode coacting to form a weld puddle of the predetermined iron content of the alloy composition in which the iron based material provides from about 35% to about 80% by weight of the iron content of the alloy composition and the balance the iron based electrode, depositing into and melting a predetermined quantity of alloy forming powder in the weld puddle sufficient to form the predetermined alloy content of alloy composition of the facing, the alloy composition being free of dilution by additional iron from the iron based material.

2. The method of claim 1 where, the iron based material provides at least a major portion of the iron content of the alloy composition.

3. The method of claim 1 where, the electric arc is created with an electric current having a current density in the single iron based electrode of not in excess of 57000 amperes per square inch of electrode cross section but sufficient to form the 35% to 80% by of the alloy composition with the iron based material.

4. An abrasion resistant surfaced plate comprising, a relatively ductile, sheet like, iron based metal plate, and a surface of abrasion resistant material welded on the iron based metal plate having an alloy composition of a predetermined quantity of alloy material, and a predetermined quantity of iron formed by about 35% to about 80% by weight of the iron based metal plate and the balance the weldable iron based electrode, the alloy composition being free of dilution by additional iron from the iron based metal plate.

5. The abrasion resistant plate of claim 4 where, the iron based metal plate comprises at least one-half of the iron in the alloy composition.

6. A plate having a surface formed of a corrosion resistant alloyed composition of a predetermined amount of corrosion resistant alloy powder and a predetermined amount of iron comprising, a relatively ductile, sheet like, weldable iron based metal plate, a portion of the alloyed composition of the plate comprised of the predetermined amount of corrosion resistant alloy powder deposited on, alloyed by, and welded to the iron based metal plate by a weld of the predetermined amount of iron formed by a weldable iron based electrode and the iron based metal plate in which about 35% to about 80% by weight of the iron based metal plate, and the iron based electrode forming the balance of the iron, the corrosion resistant alloyed composition being free of dilution by additional iron from the iron based plate.

7. The corrosion resistant surfaced plate of claim 6 where, the iron based metal plate forms at least one-half of the iron of the corrosion resistant alloyed composition.

* * * * *